(12) United States Patent
Gullapalli et al.

(10) Patent No.: US 7,983,886 B2
(45) Date of Patent: Jul. 19, 2011

(54) METHODS FOR PERFORMING SIMULATION OF SURFACTANT FLOODING OF A HYDROCARBON RESERVOIR

(75) Inventors: Irene Lee Gullapalli, San Ramon, CA (US); Mark Chih-Hung, Danville, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 750 days.

(21) Appl. No.: 11/852,679

(22) Filed: Sep. 10, 2007

(65) Prior Publication Data

US 2009/0070085 A1    Mar. 12, 2009

(51) Int. Cl.
G06G 7/48 (2006.01)
(52) U.S. Cl. ......................................................... 703/10
(58) Field of Classification Search ...................... 703/10
See application file for complete search history.

(56) References Cited

U.S. PATENT DOCUMENTS

| | | | |
|---|---|---|---|
| 5,068,043 A | 11/1991 | Thigpen et al. | |
| 6,022,834 A | 2/2000 | Hsu et al. | |
| 6,662,146 B1 | 12/2003 | Watts | |
| 2004/0055208 A1 | 3/2004 | Chakrabarty et al. | |
| 2005/0165593 A1* | 7/2005 | Lenormand et al. | 703/10 |
| 2005/0256688 A1 | 11/2005 | Le Ravalec-Dupin et al. | |
| 2008/0133193 A1* | 6/2008 | Gdanski et al. | 703/10 |
| 2009/0055141 A1* | 2/2009 | Moncorge et al. | 703/2 |

OTHER PUBLICATIONS

UTCHEM 9.0 "vol. II: Technical Documentation for UTCHEM 9.0", Jul. 2000, Austin Tx, Univ. Texas at Auston.*
Lin et al., A Study of Micellar/Polymer Flooding Using a Compositional Simulator, Ph.D. dissertation, Dec. 1981, pp. 1-476, The University of Texas at Austion.
Saad, Field Scale Simulation of Chemical Flooding, Dissertation of Doctor of Philosophy, Aug. 1989, pp. 1-488, The University of Texas at Austin.
Pope et al., A New Generation Chemical Flooding Simulator, Jan. 2005, pp. 1-161, Center for Petroleum and Geosystems Engineering.
Meter et al. Tube Flow of Non-Newtonian Polymer Solutions: Part I. Laminar Flow and Rheological Models, A.I.Ch.E. Journal, Nov. 1964, pp. 878-881, vol. 10, No. 6.
Meter et al. Tube Flow of Non-Newtonian Polymer Solutions: Part II. Turbulent Flow, A.I.Ch.E. Journal, Nov. 1964, pp. 878 881, vol. 10, No. 6.
Huh, Interfacial Tensions and Solubilizing Ability of a Microemulsion Phase That Coexists with Oil and Brine, Journal of Colloid and Interface Science, Sep. 1979, pp. 408-426, vol. 71, No. 2.
Salager et al., Optimum Formulation of Surfactant/Water/Oil Systems for Minimum Interfacial Tension or Phase Behavior, Society of Petroleum Engineers Journal 7054-PA, Apr. 1979, pp. 107-115.

(Continued)

*Primary Examiner* — David Silver
(74) *Attorney, Agent, or Firm* — Craig R. Vander Ploeg; Christopher D. Northcutt; Maurice E. Teixeira

(57) ABSTRACT

The present invention performs numerical simulation of surfactant flooding during enhanced oil recovery of a given hydrocarbon reservoir. The present invention utilizes an improved method for determining relative permeability while maintaining physical consistency when the phase behavior varies between different phase Types. This new relative permeability model maintains the physical consistency in the transition from Type II(−) to Type III to Type II(+) systems and vice versa.

15 Claims, 3 Drawing Sheets

OTHER PUBLICATIONS

Hirasaki, Application of the Theory of Multicomponent, Multiphase Displacement to Three-Component, Two-Phase Surfactant Flooding, Society of Petroleum Engineers Journal, Apr. 1981, pp. 191-204.

Camilleri et al., Description of an Improved Compositional Micellar/Polymer Simulator, SPE Reservoir Engineering, Nov. 1987, pp. 427-432.

Camilleri et al., Improvements in Physical-Property Models Used in Micellar/Polymer Flooding, SPE 12723, SPE Reservoir Engineering, Nov. 1987, pp. 433-440.

Volume II: Technical Documentation for UTChem-9.0 A Three-Dimensional Chemical Flood Simulator, Jul. 2000.

UTCHEM University of Texas Chemical Compositional Simulator, www.cpge.utexas.edu/utchem/, Jul. 2000.

NETL National Energy Technology Laboratory, A New-Generation Chemical Flooding Simulator, www.netl.doe.gov/technologies/oil-gas/Petroleum/projects/EP/ResChar/15314UofTX.htm.

STARS Steam, Thermal and Advanced processes Reservoir Simulator, www.cmgl.ca/software/stars.htm.

PCT International Search Report dated Nov. 14, 2008 (2 pages).

PCT International Preliminary Report on Patentability date of mailing Mar. 25, 2010 (5 pages).

* cited by examiner

METHODS FOR PERFORMING SIMULATION OF SURFACTANT FLOODING OF A HYDROCARBON RESERVOIR

BACKGROUND OF THE INVENTION

This invention relates to reservoir simulation and in particular to methodologies for performing simulation of surfactant flooding during enhanced oil recovery (EOR) of a given hydrocarbon reservoir.

Hydrocarbons may be extracted from source rock in a number of stages. Generally, the first stage utilises the pressure present in the underground reservoir to force the hydrocarbon to the surface through a hole that is drilled from the surface down into the reservoir. This stage continues until the pressure decreases such that it is insufficient to force oil to the surface, requiring additional oil extraction measures.

In the second stage, a number of techniques may be used to recover oil from reservoirs having depleted pressure. These techniques may include the use of pumps to bring the oil to the surface and increasing the reservoir's pressure by injecting water or gas. However, after these methods have been applied, a large percentage of oil often remains trapped in porous rock. The injection of plain saltwater alone, for example, may only recover half of the crude oil with the remainder trapped as small oil droplets due to high capillary forces in the micron-size pores in the reservoir rock.

One method of recovering the remaining trapped oil in the reservoir rock is to utilize surfactant EOR. Surfactant EOR is based on the use of surfactants that reduce the interfacial tension (IFT) between the aqueous phase and the hydrocarbon phase, allowing for the mobilization of oil that is trapped in pores.

One tool that is used to minimize the risk associated with the different ways of recovering the hydrocarbons in a reservoir is to create a computer or numerical model to simulate the behavior of the reservoir as it undergoes the different types of recovery processes. Reservoir simulation has become an increasingly widespread and important tool for analyzing and optimizing oil recovery projects. Numerical simulation of large hydrocarbon reservoirs with complex recovery processes is computationally challenging due to the problem size and detailed property calculations involved. This problem is compounded by the finer resolution needed to model such processes accurately.

Currently, there are existing reservoir models which are used to predict the behavior of hydrocarbon reservoirs undergoing surfactant EOR. However, due to the complex nature of the simulation the prior art surfactant EOR models have certain limitations. The prior art reservoir simulations utilize certain physical phenomena in order to accurately predict the behavior of the reservoir undergoing surfactant EOR. Some physical phenomena of the reservoir which are modeled in the prior art simulation models include density, viscosity, velocity-dependent dispersion, molecular diffusion, adsorption, interfacial tension, relative permeability, capillary pressure, capillary trapping, cation exchange, and polymer and gel properties. The present invention, in general, focuses on reservoir simulations undergoing surfactant EOR which include relative permeability models to accurately perform the simulations.

As one skilled in the art will appreciate, surfactant-brine-oil phase behavior affects the relative permeability of a particular reservoir and, as such, needs to be considered as the salinity of the fluids in the reservoir change. Surfactant phase behavior is strongly affected by the salinity of brine present in the reservoirs and in the surfactant formulation. At low brine salinity, a typical surfactant will exhibit good aqueous-phase solubility and poor oil-phase solubility. Thus an overall composition near the brine-oil boundary of the ternary will split into two phases: an excess oil phase that is essentially pure oil and a (water-external) microemulsion phase that contains brine, surfactant, and some solubilized oil. The solubilized oil occurs when globules of oil occupy the central core of the swollen micelles. This type of phase environment is called a Winsor Type II(−) system. II in this context means no more than two phases can (not necessarily will) form, and the − means the tie lines in a phase diagram representing the system will have a negative slope.

For high brine salinities, electrostatic forces drastically decrease the surfactant's solubility in the aqueous phase. An overall composition within the two-phase region will now spilt into an excess brine phase and an (oil-external) microemulsion phase that contains most of the surfactant and some solubilized brine. The + means that the tie lines in a phase diagram representing the system will have a positive slope.

At salinities between those of Type II(−) and II(+) systems, there must be a continuous change between these systems. This occurs within a range of salinities where a third surfactant-rich phase is formed. An overall composition within the three-phase region separates into excess oil and brine phases, as in the Type II(−) and II(+) environments, and into a microemulsion phase whose composition is represented by an invariant point. This environment is called a Winsor Type III system.

Currently, there is no numerical model which can simulate the relative permeability characteristics of a reservoir which covers full spectrum of phase behavior and maintains the physical consistency during the transition from Type II(−) to III to Type II(+) system and vice versa. Prior art models, including UTCHEM, the University of Texas Chemical Compositional Simulator, can only successfully simulate a chemical flood that operates at a condition where the phase diagram varies between Type II(−) and Type III or at a condition where the phase diagram varies between Type II(+) and Type III. The prior art reservoir simulators cannot model the -reservoir correctly if the phase diagram traverses all three phase types. Thus, there exists a need for improved methods for performing reservoir simulations which include surfactant EOR.

SUMMARY OF THE INVENTION

The present invention overcomes the above described and other shortcomings of the prior art by providing a novel and improved method for performing reservoir simulations which include surfactant EOR. The present invention includes a method for performing reservoir simulations which utilize a relative permeability model that maintains the physical consistency in the transition between Type II(−) and III systems and that between Type II(+) and III systems.

One embodiment of the present invention includes a method of modeling surfactant flood in a petroleum reservoir which includes solving a mass conservation equation for each component with constraint equations to obtain pressure, saturation, and composition for a petroleum reservoir undergoing a surfactant flood. This embodiment of the present invention further includes applying the solutions to determine physical properties wherein phase relative permeabilities are evaluated by using a continuous relative permeability model to cover the full spectrum of phase behavior.

Another embodiment of the present invention further includes solving the mass conservation equation for each component with constraint equations to obtain pressure, saturation, and composition for a petroleum reservoir undergoing the surfactant flood, wherein the equations are solved implicitly.

An additional embodiment of the present invention also includes a separator flash which uses a separator condition and a well production rate of surfactant, oil, water, cation and anion to determine the phase fraction and phase composition of the production stream. It also includes the temperature effect on the optimum salinity.

A further embodiment of the present invention includes utilizing rock properties to evaluate the surfactant properties of the surfactant flood.

It should also be appreciated that the present invention is intended to be used with a system which includes, in general, a computer configuration including at least one processor, at least one memory device for storing program code or other data, a video monitor or other display device (i.e., a liquid crystal display) and at least one input device. The processor is preferably a microprocessor or microcontroller-based platform which is capable of displaying images and processing complex mathematical algorithms. The memory device can include random access memory (RAM) for storing event or other data generated or used during a particular process associated with the present invention. The memory device can also include read only memory (ROM) for storing the program code for the controls and processes of the present invention.

Additional features and advantages of the present invention are described in, and will be apparent from, the following Detailed Description of the Invention and the Figures.

BRIEF DESCRIPTION OF THE DRAWINGS

These and other objects, features and advantages of the present invention will become better understood with regard to the following description, pending claims and accompanying drawings where:

DETAILED DESCRIPTION OF THE INVENTION

Figure 1:
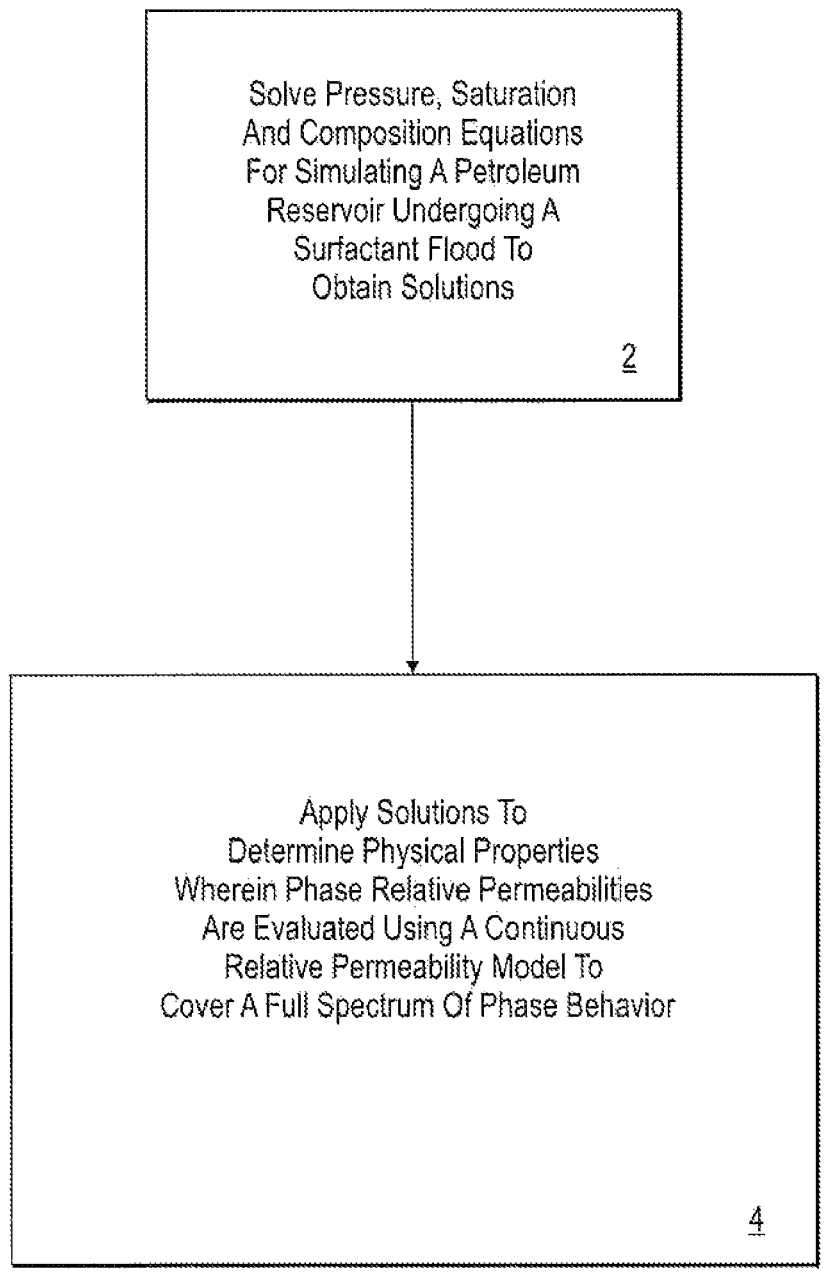
FIG. 1 illustrates a flow chart of one embodiment of the present invention.

While this invention is susceptible to embodiments in many different forms, these are shown in the drawings, and will herein be described in detail, preferred embodiments of the invention with the understanding that the present disclosure is to be considered as an exemplification of the principles of the invention and is not intended to limit the broad aspect of the invention to the embodiments illustrated.

One embodiment of the present invention is illustrated in the flowchart depicted in FIG. 1. In that embodiment, the method of modeling the surfactant flood of a petroleum reservoir includes solving a mass conservation equation for each component with constraint equations for a petroleum reservoir undergoing a surfactant flood to obtain a plurality of solutions 2. Once the solutions are obtained, they are used to determine physical properties wherein phase relative permeabilities are evaluated using a continuous relative permeability model to cover a full spectrum of phase behavior 4.

Another embodiment of the present invention is an isothermal, fully implicit, compositional reservoir model. Prior art models explicitly solve the mathematical models related to the physical properties of a particular reservoir. These implicit-Pressure-Explicit-Saturation (IMPES) models can have numerical instability because the model solves only pressure equation implicitly to obtain pressure at the current time level. Other equations are solved explicitly using the pressure and then the solutions such as concentrations are used to solve the pressure equation at the next time level. This is going to introduce the well known IMPES numerical instability. This embodiment of the present invention solves equations implicitly, thus, providing a more stable process than the prior art simulations.

Figure 2:
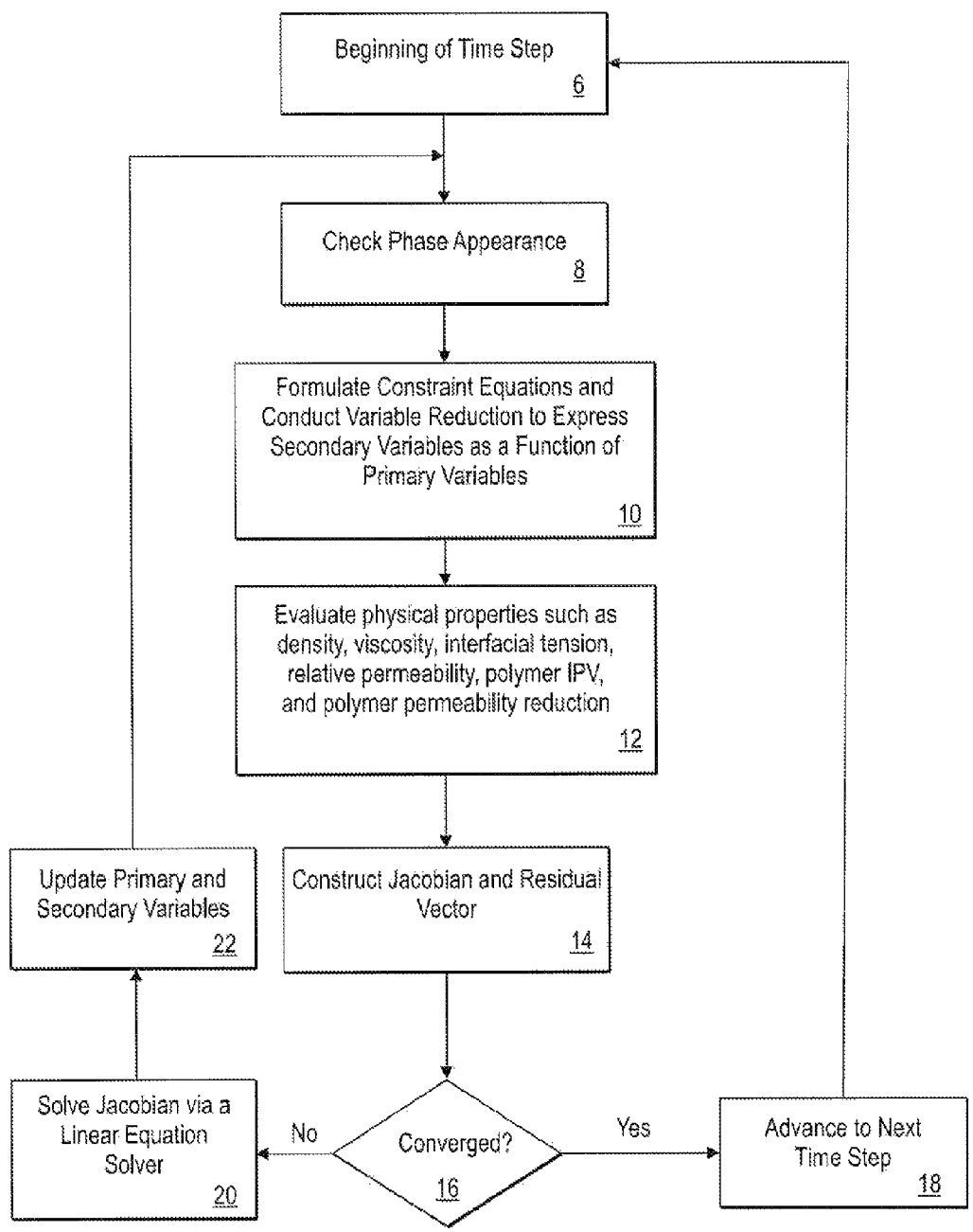
FIG. 2 illustrates a flow chart of another embodiment of the present invention.

FIG. 2 illustrates, in general, the steps of this embodiment of the present invention. The phase appearance is first determined 8. The constraint equations are then Formulated and variable reduction is conducted to express the secondary variables as a function of the primary variables 10. The physical properties, such as density, viscosity, interfacial tension, relative permeability, polymer inaccessible pore volume (IPV) and polymer permeability reduction are evaluated 12. A Jacobian and Residual Vector is constructed 14 and convergence is attempted 16. If the convergence 16 is successful, the method continues to the next time step 18. If the method is unsuccessful, the Jacobian and Residual Vector is solved utilizing a Linear Equation Solver 20 the primary and secondary variables are updated 22, and the process starts over from the beginning 6.

Figure 3:
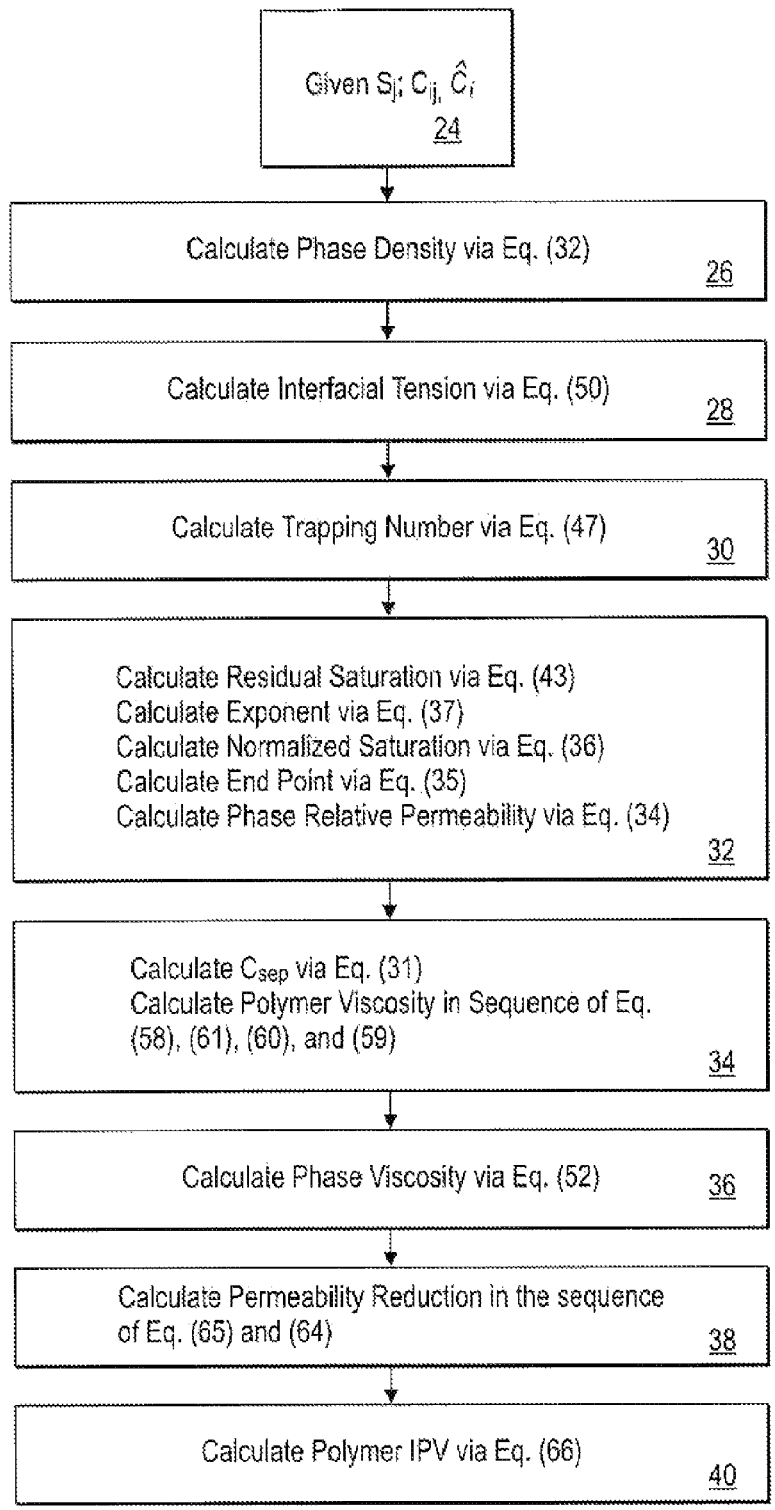
FIG. 3 illustrates a certain aspect of the embodiment of the present invention shown in FIG. 2 in more detail.

In this embodiment of the present invention, the formulation of the constraint equation and variable reduction 10 provide saturations and compositions which are used in a Newton iteration. These properties are then used to evaluate the physical properties as shown in FIG. 3. Utilizing the phase j saturation ($S_j$), concentration of component i in phase j ($C_{ij}$) and adsorbed concentration of component i ($\hat{C}_i$) 24, the phase density is calculated 26, followed by the interfacial tension 28. The trapping number is then calculated 30. In the next step, the residual saturation, exponent, normalized saturation, end point and phase relative permeability are calculated 32, followed by the effective salinity for polymer ($C_{SEP}$) and polymer viscosity 34. Phase viscosity 36, permeability reduction 38 and polymer IPV 40 are then calculated.

The reservoir model in this embodiment of the present invention utilizes components which water, oil, surfactant, polymer, total anion, calcium, and multiple numbers of tracers. For convenience of discussion, the following indexes are used for these components:

1: Water

2: Oil

3: Surfactant

4: Polymer

5: Total Anion

6: Calcium

7: Tracers

And the following indexes are used for phases:

1: aqueous phase

2: oleic phase

3: microemulsion phase

No gas is allowed in the model. The reservoir model simulates three Types of surfactant/oil/brine phase behavior: Type II(−), Type III, and Type II(+) at varying salinity conditions. Thus, the reservoir will model up to three phases; aqueous, oleic, and microemulsion. With assumption of local thermodynamic equilibrium, no capillary pressure, and no physical dispersion, the continuity of mass for component i can then be expressed in terms of overall quantity of component i:

$$\frac{\partial}{\partial t}(\phi \tilde{C}_i \rho_i) + \nabla \cdot \sum_{j=1}^{3} \rho_i C_{ij} \vec{u}_j = Q_i, \ i = 1 \sim 7 \quad (1)$$

where $\phi$ is porosity, $\tilde{C}_i$ is the overall quantity of component i per unit pore volume, $\rho_i$ is the density of pure component i, $C_{ij}$ is the concentration of component i in phase j, $\vec{u}_j$ is the Darcy's flux of phase j, and $Q_i$ is the source term. There are three volume-occupying components in this embodiment; water, oil, and surfactant. All other components are assumed to be not occupying volume. That means the liquid volume is not affected by the dissolution of these components. For the component quantity, $\tilde{C}_i$, in Eq. (1), volume for volume-occupying components is used, weight % for polymer, meq for salts, and user preferred unit for tracers.

$\tilde{C}_i$ is the sum over all phases including the adsorbed phases;

$$\tilde{C}_i = \left(1 - \sum_{i=1}^{ncv} \hat{C}_i\right) \sum_{j=1}^{3} S_j C_{ij} + \hat{C}_i, \ i = 1 \sim 7 \quad (2)$$

where ncv is the total number of volume-occupying components; water, oil, and surfactant. This implies that. $C_{1j}+C_{2j}+C_{3j}=1$, $\hat{C}_i$ is the adsorbed concentration of species i, $S_j$ is the phase j saturation.

$\rho_i$ and $\phi$ at pressure P are given by:

$$\rho_i = \rho_i^0[1 + C_i^0(P - P^0)] \quad (3a)$$

$$\phi = \phi^0(1 + C_r(P - P_r^0)) \quad (3b)$$

where $\rho_i^0$ and $C_i^0$ are the component density and compressibility at reference pressure, $P^0$, respectively. $C_r$ is the rock compressibility. $P_r^0$ is a reference pressure for porosity.

$\vec{u}_j$, the phase flux from Darcy law is given by:

$$\vec{u}_j = \frac{k_{rj}\bar{k}}{\mu_j} \cdot (\nabla p_j - \gamma_j \nabla h), \ j = 1, 2, 3 \quad (4)$$

where $\bar{k}$ is the permeability, h the depth, $k_{rj}$ is the phase relative permeability, $\mu_j$ is the phase viscosity, and $\gamma_j$ is the specific weight of phase j.

The mathematical model of physical properties used in this embodiment of the present invention includes models for cation exchange, phase behavior, adsorption, molar density, relative permeability, interfacial tension, viscosity, partition tracer model and finally polymer properties.

Cation exchange occurs when there is incompatibility in the electrolyte composition of injected fluid and the initial fluids saturating the soil. Cations exist in the form of free ions, adsorbed on clay surfaces, and associated with either surfactant micelles or adsorbed surfactant. This particular embodiment of the present invention utilizes k=8 for sodium for convenience. Sodium does not actually appear in the mass conservation equation. The equation for the exchange of calcium (k=6) and sodium on clay and surfactant is:

$$\frac{(C_8^x)^2}{C_6^x} = \beta^x C_3^m \frac{(C_8^f)^2}{C_6^f} \quad (5)$$

$$\frac{(C_8^c)^2}{C_6^c} = \beta^c \frac{Q_v}{C_1} \frac{(C_8^f)^2}{C_6^f} \quad (6)$$

where the superscript f, c, and s denote free cation, adsorbed cation on clay, and adsorbed cation on micelles, respectively, $Q_v$ is the cation exchange capacity of the mineral. $\beta^s$ and $\beta^c$ are the ion exchange constants for surfactant and clay. They are all input parameters. $C_1$ is the overall concentration of water in the mobile phase. The overall concentration of component i in the mobile phase is defined as;

$$C_j = \sum_{j=1}^{3} S_j C_{ij} \ i = 1 \sim 7 \quad (7)$$

$C_3^m$ is the concentration of surfactant in meq/ml of water and is given by:

$$C_3^m = \frac{1000\tilde{C}_3}{\tilde{C}_1 M_3} \quad (8)$$

where $M_3$ is the equivalent weight of surfactant. The electrical neutrality and mass balances needed to close the system of ion exchange equations are:

$$C_6^f = C_8^f + C_6^f \quad (9)$$

$$\frac{\tilde{C}_6}{\tilde{C}_1} = C_6^f + C_6^x + C_6^c \quad (10)$$

$$C_3^M = C_6^n + C_8^s \quad (11)$$

$$\frac{Q_v}{\tilde{C}_1} = C_6^c + C_8^c \quad (12)$$

Eq. (9) states that the charge of total free anions should be equal to that of free sodium and free calcium. All concentrations with superscript f, s, and c in ion exchange equations are expressed in meq/ml of water.

The surfactant/oil/water system modeled by this particular embodiment of the present invention will exhibit three Types of phase behavior depending on salinity: Type II(−), Type III, and Type II(+). At low salinity, two phases exist; an excess oil phase that is essentially pure oil and a microemulsion phase that contains water, salt, surfactant, and solubilized oil, Type II(−). If the surfactant concentration is below critical micelle concentration (CMC), the two phases are an aqueous phase containing all the surfactant, electrolytes, and dissolved oil at the water solubility limit and a pure excess oil phase. At high salinity, an excess water phase, and a microemulsion phase containing most of non-aqueous components will exist, Type II(+). At an intermediate salinity, the system will separate into three phases, Type III. These phases are excess oil and water phases and a microemulsion phase.

The surfactant/oil/water phase behavior is a function of salinity ($C_{SE}$):

$$C_{SE} = C_{51}(1 - \beta_6 f_6^s)^{-1}, \quad (13)$$

where $C_{51}$ is the aqueous phase anion concentration, $\beta_6$ is a positive constant and is a model input parameter, $f^s_6$ is the fraction of the total divalent cations (Calcium) bond to surfactant micelles as:

$$f^s_6 = \frac{C^x_6}{C^m_3} \quad (14)$$

In this embodiment, symmetric binodal curve and tie lines are used to describe the phase diagram and Hand's rule is used to model the binodal curve. The symmetric binodal curve and tie line approach is a curve-fitting model, which assumes equilibrium phase concentration ratios are straight lines on a log-log scale. The symmetric binodal curve is given by:

$$\frac{C_{3j}}{C_{2j}} = A\left(\frac{C_{3j}}{C_{1j}}\right)^{-1} \; j = 1, 2, 3 \quad (15)$$

$C_{ij}$ is the volume fraction of component i in phase j. Given Eq. (15) and $$\sum_{i=1}^{3} C_{ij} = 1,$$

it is obtained by:

$$C_{3j} = \frac{1}{2}\left[-AC_{2j} + \sqrt{(AC_{2j})^2 + 4AC_{2j}(1-C_{2j})}\right], \; j = 1, 2, 3 \quad (16)$$

The parameter A is related to the height of binodal curve as follows:

$$A_s = \left(\frac{2C_{3max,s}}{1-C_{3max,s}}\right)^2 \quad (17)$$

where s=0, 1, 2 represents zero, optimal, and high salinities, $C_{3max,s}$ is the height of the binodal curve at salinity s. The high salinity (s=2) is set to be twice of the optimum salinity $C_{SEOP}$, which is given by:

$$C_{SEOP} = \frac{C_{SEL} + C_{SEU}}{2}, \quad (18)$$

where $C_{SEL}$ and $C_{SEU}$ are lower and upper limit of effective salinities at which the three equilibrium phase forms and disappears.

Linear interpolation is used to determine the A parameter for intermediate salinities.

$$A = (A_0 - A_1)\left(1 - \frac{C_{SE}}{C_{SEOP}}\right) + A_1 \; \text{for} \; C_{SE} \leq C_{SEOP} \quad (19)$$

$$A = (A_2 - A_1)\left(\frac{C_{SE}}{C_{SEOP}} - 1\right) + A_1 \; \text{for} \; C_{SE} > C_{SEOP} \quad (20)$$

The lines for two phases are given by:

$$\frac{C_{3j}}{C_{2j}} = E\left(\frac{C_{33}}{C_{13}}\right) \quad (21)$$

where j=1 for Type II(+) and j=2 for Type II(−). Since the plait point is on both binodal curve equation and tie line:

$$E = \frac{C_{1p}}{C_{2p}} = \frac{1 - C_{2p} - C_{3p}}{C_{2p}} \quad (22)$$

Applying the binodal curve equation to the plait point and substituting $C_{3p}$, Eq. (16) in Eq. (22):

$$E = \frac{1 - C_{2p} - 0.5\left[-AC_{2p} + \sqrt{(AC_{2p})^2 + 4AC_{2p}(1 - C_{2p})}\right]}{C_{2p}} \quad (23)$$

where $C_{2p}$ is the oil concentration at the plait point and is an input parameter.

The phase-composition calculation of the three phase region of Type III is straightforward due to the assumption that the excess oleic and aqueous phases are pure. The microemulsion phase composition is defined by the coordinates of the invariant point $C_{2M}$, which is a function of effective salinity as follows:

$$a = \left(\frac{C_{SE} - C_{SEL}}{C_{SEU} - C_{SEL}}\right) \quad (24a)$$

$$C_{2M} = \frac{2a(4-A) + A + \sqrt{(2a(4-A) + A)^2 - 16a^2(4-A)}}{2(4-A)} \quad (24b)$$

where M denotes the invariant point. $C_{3M}$ is computed by substituting $C_{2M}$ in Eq. (16) where $C_{2j}$ is replaced by $C_{2M}$ and noting that $C_{1M}=1-C_{2M}-C_{3M}$. Accordingly, tie lines for the Type II(−) and Type II(+) lobes on the Type III pattern can now be derived.

For a Type II(−) lobe, the plait point is calculated by interpolation on effective salinity. The subscript PL designates left plait point and PR refers to right plait point.

$$C_{2PR} = C^*_{2PR} + \left(\frac{C_{SE} - C_{SEL}}{C_{SEU} - C_{SEL}}\right)(1 - C^*_{2PR}) \quad (25)$$

where $C^*_{2PR}$ is the height of the plait point of Type II(−) at $C_{SEL}$.

In order to apply Hand's equation, the concentration is transformed as follows:

$$C'_{1j} = C_{1j}\sec\theta, \; j = 2, 3 \quad (26a)$$

$$C'_{3j} = C_{3j} - C_{2j}\tan\theta, \; j = 2, 3 \quad (26b)$$

$$C'_{2j} = 1 - C'_{1j} - C'_{3j}, \; j = 2, 3 \quad (26c)$$

where $$\tan\theta = \left(\frac{C_{3M}}{C_{1M}}\right) \quad (27)$$

-continued and $$\sec\theta = \left(\frac{\sqrt{C_{1M}^2 + C_{3M}^2}}{C_{1M}}\right) \quad (28)$$

Parameter E of the tie line equation is now calculated in terms of untransformed coordinates of the plait point as:

$$E = \frac{C'_{1P}}{C'_{2P}} = \left(\frac{1-(\sec\theta - \tan\theta)C_{2PR} - C_{3PR}}{C_{2PR}\sec\theta}\right) \quad (29)$$

where $C_{3PR}$ will replace $C_{3j}$ given by Eq. (16) and $C_{1PR} = 1 - C_{2PR} - C_{3PR}$.

A Langmuir-Type adsorption isotherm is used to model surfactant and polymer adsorption as a function of concentration and salinity.

$$\frac{\hat{C}_i}{\tilde{C}_1} = \min\left(\frac{\tilde{C}_i}{\tilde{C}_1}, \frac{a_i\left(\frac{\tilde{C}_i}{\tilde{C}_1} - \frac{\hat{C}_i}{\tilde{C}_1}\right)}{1 + b_i\left(\frac{\tilde{C}_i}{\tilde{C}_1} - \frac{\hat{C}_i}{\tilde{C}_1}\right)}\right), i = 3, 4 \quad (30)$$

where $a_3 = (a_{31} + a_{32}C_{SE})$ and $a_4 = (a_{41} + a_{42}C_{SEP})$ with the effective salinity for polymer ($C_{SEP}$):

$$C_{SEP} = \frac{C_{51} + (\beta_P - 1)C_{61}}{C_{11}} \quad (31)$$

where $\beta_p$ is a model input parameter, $\hat{C}_1$ is the adsorbed concentration and $\tilde{C}_i$ is overall concentration of component i. The concentration in these equations is defined as quantity of component i divided by pore volume, $a_{i1}$, $a_{i2}$, and $b_i$ are model parameters. Like the relative permeability, these parameters could vary with the rock regions. This implementation assumes adsorption is irreversible with respect to concentration.

Phase specific weight ($\gamma_j = g\rho_j$) is modeled as a function of pressure and composition as follows:

$$\gamma_j = C_{1j}\gamma_{1j} + C_{2j}\gamma_{2j} + C_{3j}\gamma_{3j} + 0.00433C_{4j} + 0.02533C_{5j} - 0.001299C_{6j}, j=1, 2, 3 \quad (32)$$

where $$\gamma_{ij} = \gamma_{iR}[1 + C_i^0(P_j - P^0)], j = 1, 2, 3 \quad (33)$$

where $\gamma_{iR}$ is the component i specific weight at a reference pressure and is an input parameter. The numerical constants account for the weight of dissolved ions and have units of psi/ft per meq/ml of ions. $C_i^0$ is the compressibility for component i.

As described above, the present invention utilizes an improved method for determining relative permeability while maintaining physical consistency when the phase behavior varies between different phase Types. This new relative permeability model maintains the physical consistency in the transition between Type II(−) and III systems and that between Type II(+) and Type III systems. The present invention utilizes a relative permeability model which is a Corey-Type model and is a function of Corey exponent $n_3$ and normalized saturation $\overline{S}_3$:

$$k_{r3} = k_{r3}^o \overline{S}_3^{n_3} \quad (34)$$

where $$k_{r3}^o = k_{r3}^{oLowLimit} + \frac{S_{xr}^{Low} - S_{xr}}{S_{xr}^{Low} - S_{xr}^{High}}\left(k_{r3}^{oHigh} - k_{r3}^{oLowLimit}\right) \quad (35)$$

$$\overline{S}_3 = \frac{S_3 - S_{3r}}{1 - \sum_{l=1}^{3} S_{lr}} \quad (36)$$

and $$n_3 = n_3^{LowLimit} + \frac{S_{xr}^{Low} - S_{xr}}{S_{xr}^{Low} - S_{xr}^{High}}(n_3^{High} - n_3^{LowLimit}) \quad (37)$$

Subscript 3 indicates displaced fluid that is the microemulsion phase and subscript x indicates displacing fluid, which could be pure water or pure oil. Variables with superscript High and Low mean that the variables are measured at the condition of high and low trapping numbers, respectively. They are model input parameters. Variables with subscript LowLimit are to be defined later. They are made to satisfy limiting conditions described earlier. The Corey exponent $n_j$ changes with phase saturation.

The function below is utilized by this embodiment of the present invention so that the relative permeability of the microemulsion phase at low capillary number ("krmLow") approaches the correct limiting conditions:

$$k_{r3}^{oLowLimit} = C_{13}k_{r1}^{oLow} + C_{23}k_{r2}^{oLow} + C_{33}k_{r3}^{oLow} \quad (38)$$

$$n_3^{LowLimit} = C_{13}n_1^{Low} + C_{23}n_2^{Low} + C_{33}n_3^{Low} \quad (39)$$

$$S_{xr}^{Low} = \frac{C_{13}S_{2r}^{Low} + C_{23}S_{1r}^{Low}}{C_{13} + C_{23}} \quad (40)$$

$$S_{xr}^{High} = \frac{C_{13}S_{2r}^{High} + C_{23}S_{1r}^{Low}}{C_{13} + C_{23}} \quad (41)$$

$$S_{xr} = \frac{C_{13}S_{2r} + C_{23}S_{1r}}{C_{13} + C_{23}} \quad (42)$$

$$S_{jr} = \min\left(S_j, S_{jr}^{High} + \frac{S_{jr}^{Low} - S_{jr}^{High}}{1 + T_j N_{T_j}}\right) \quad (43)$$

and $$S_{3r} = \min\left(S_3, S_{3r}^{High} + \frac{S_{3r}^{LowLimit} - S_{3r}^{High}}{1 + T_3 N_{T_3}}\right) \quad (44)$$

where $$S_{3r}^{LowLimit} = C_{13}S_{1r}^{Low} + C_{23}S_{2r}^{Low} + C_{33}S_{3r}^{Low} \quad (45)$$

$$N_{T3} = \frac{C_{13}N_{T32} + C_{23}N_{T31}}{C_{13} + C_{23}} \quad (46)$$

$$N_{T3f} = \frac{\left|-\vec{k}\cdot\nabla\Phi_{j'} - \vec{k}[g(\rho_3 - \rho_f)\nabla h]\right|}{\sigma_{3j'}}, j' = 1, 2 \quad (47)$$

In arriving Equations (38) and (39), it should be noted that:

$$C_{13} + C_{23} + C_{33} = 1 \quad (48)$$

In Equation (47), the microemulsion phase with the subscript of 3 is the displaced fluid and j' is displacing fluid, $N_T$ is the trapping number, a dimensionless number that includes both the buoyancy and viscous forces on the trapped oil globule. $T_j$ is capillary desaturation curve parameter for phase j. They are model input parameters and could vary with the rock regions. With the above definition, KrmLow reduces to KrwLow when the microemulsion phase contains mostly water (i.e. $C_{13}$ is nearly 1.0 and both $C_{23}$ and $C_{33}$ is nearly 0.0) and KrmLow reduces to KrmLow when the microemulsion phase constains mostly oil (i.e. $C_{23}$ is nearly 1.0 and both $C_{13}$ and $C_{33}$ is nearly 0.0). KrwLow is the relative permeability of the water phase at low capillary number, and KroLow is the relative permeability of the oil phase at low capillary number.

For interfacial tension, Chun-Huh's interfacial tension-correlation is used. That correlation is given by:

$$\sigma_{j3} = \frac{c}{R_{j3}^2}, \, j = 1, 2 \tag{49}$$

where c is typically equal to 0.3 and $$R_{j3} = \frac{C_{j3}}{C_{33}}$$

is the oil solubilization ratio of phase j. Hirasaki's correction factor is used to modify the Chun-Huh's equation so that it reduces to the oil-water interfacial tension as the surfactant concentration approaches zero;

$$\sigma_{j3} = \sigma_{ow} e^{-aR_{j3}} + \frac{cF}{R_{j3}^2}(1 - e^{-aR_{j3}^3}) \text{ where } j = 1, 2 \tag{50}$$

where $F_j$ is the correction factor introduced by Hirasaki:

$$F_j = \frac{1 - e^{-\sqrt{\sum_{i=1}^{3}(C_{ij}-C_{i3})^2}}}{1 - e^{-\sqrt{2}}} \text{ where } j = 1, 2 \tag{51}$$

When $C_3$<CMC, there is no surfactant influence so interfacial tension becomes that of oil-water interfacial tension ($\sigma_{ow}$), a and e are model input parameters.

For phase viscosity, the viscosity of oil, water, and microemulsion phases is modeled as follows:

$$\mu_j = C_{1j}\mu_p e^{\alpha_i(C_{2j}+C_{3j})} + C_{2j}\mu_2 e^{\alpha_2(C_{1j}+C_{3j})} + C_{3j}\alpha_3 e^{(\alpha_4 C_{1j}+\alpha_5 C_{2j})}, \tag{52}$$
$$j = 1, 2, 3$$

where $\alpha_{1-5}$ are model parameters, $\mu_p$ is the polymer solution viscosity based on Eq. (59). It reduces to water viscosity in the absence of polymer. The pure water and oil viscosities are $\mu_w$ and $\mu_2$, respectively.

For the partitioning tracer model, the tracer could partition between wafer and oil component. The partition coefficient is defined as:

$$K_T = \frac{C_{T2p}}{C_{T1p}} \tag{53}$$

where $C_{T1p}$ and $C_{T2p}$ are the tracer concentrations in the water and oil pseudocomponents. The concentrations of water and oil pseudo components are the concentrations of oil and water in ail phases. The tracer compositions in oil and water phases are then computed from:

$$C_{T1} = C_{11}C_{T1p} + C_{21}C_{T2p} \tag{54}$$

where $$C_{T1p} = \frac{C_T}{C_1 + C_2 K_T} \tag{55}$$

$$C_{T2p} = K_T \frac{C_T}{C_1 + C_2 K_T} \tag{56}$$

where $C_1$ and $C_2$ are the overall concentration of water and oil as defined in Eq. (7), The partitioning coefficient of tracer i as a function of reservoir salinity is modeled using a linear relationship as:

$$K_{Ti} = K_{Ti}^0(1 + TKS_i(C_{51} - C_{51}^0)) \tag{57}$$

where $C_{51}$ is the concentration of anions in aqueous phase and $C_{51}^0$ is the concentration of anions in aqueous phase at a reference condition, usually initial reservoir condition.

$TKS_i$ is a constant input parameter and $K_{Ti}^0$ is the partition coefficient at the reference salinity of $C_{51}^0$ in meq/ml.

For polymer viscosity, the Flory-Huggins equation is modified to account for variation in salinity as:

$$\mu_p^0 = \mu_w\left(1 + \left(A_{p1}\frac{C_4}{C_1} + A_{p2}\left(\frac{C_4}{C_1}\right)^2 + A_{p3}\left(\frac{C_4}{C_1}\right)^3\right)C_{SEP}^{Sp}\right), j = 1, 3 \tag{58}$$

$A_{p1}, A_{p2}, A_{p3}$, and Sp are model input parameters. Sp is the slope of $$\frac{\mu_p^0 - \mu_w}{\mu_w}$$

vs. $C_{SEP}$ on a log-log plot. The effective polymer salinity is given in Eq. (31). The reduction in polymer solution viscosity as a function of shear rate ($\dot{\gamma}$) is modeled by Meter's equation (Meter and Bird, 1964):

$$\mu_p = \mu_w + \frac{\mu_p^0 - \mu_w}{1 + \left[\frac{\dot{\gamma}}{\dot{\gamma}_{1/2}}\right]^{P_\alpha - 1}}, \tag{59}$$

where $\dot{\gamma}_{1/2}$ is the shear rate at which viscosity is the average of $\mu_p^0$ and $\mu_w$. $P_\alpha$ is an empirical coefficient. When the above equation is applied to flow in permeable media, the shear rate $\dot{\gamma}$ becomes the equivalent shear $\dot{\gamma}_{eq}$. This is modeled by the modified Blake-Kozeny capillary bundle equation for multiphase flow as follows:

$$\dot{\gamma}_{eq} = \frac{\dot{\gamma}_c |u_j|}{\sqrt{(\bar{k}_j k_{rj} \phi S_j)}}, j = 1, 3 \tag{60}$$

where $\dot{\gamma}_c$ is equal to 3.97C sec$^{-1}$ and C is the shear rate coefficient used to account for non-ideal effects such as slip at the pore walls. The appropriated average permeability $\bar{k}_j$ is given by:

$$\bar{k}_j = \left[\frac{1}{k_x}\left(\frac{u_{xj}}{u_j}\right)^2 + \frac{1}{k_y}\left(\frac{u_{yj}}{u_j}\right)^2 + \frac{1}{k_z}\left(\frac{u_{zj}}{u_j}\right)^2\right]^{-1}, j=1,3 \quad (61)$$

For polymer permeability reduction, the permeability reduction is measured by a permeability reduction factor, $R_K$:

$$R_k = \frac{\text{effective permeability of water}}{\text{effective permeability of polymer solution}}, \quad (62)$$

The change in mobility due to tire combined effect of increased viscosity-of polymer solution and reduced permeability is called the resistance factor, $R_F$:

$$R_F = R_k \frac{\mu_p}{\mu_w} \quad (63)$$

The effect of permeability reduction lasts even after the polymer solution has passed through the porous medium and is called the residual resistance factor, $R_{RF}$ The permeability reduction is modeled as;

$$R_k = 1 + \frac{(R_{k,min}-1)b_{rk}C_{4j}}{1+b_{rk}C_{4j}} \quad (64)$$

where $$R_{k,min} = \min\left\{\left[1 - \frac{c_{rk}(A_{pl}C_{SEP}^{Sp})^{1/3}}{\left[\frac{\sqrt{k_x k_y}}{\phi}\right]^{1/2}}\right]^{-4}, 10\right\} \quad (65)$$

where j refers to the phase with the highest polymer concentration. $b_{rk}$ and $c_{rk}$ are input parameters. The effect of permeability reduction is assumed to be irreversible, i.e., it does not decrease as the polymer concentration decreases and, thus, $R_{RF}=R_K$.

The viscosity of the phase that contains the polymer is multiplied by $R_K$ to account for the mobility reduction in the simulator.

For polymer Inaccessible pore volume, it is modeled by multiplying the porosity in the mass conservation equation for polymer by an input parameter of effective pore volume:

$$\phi_{polymer} = \phi \times \text{effective pore volume} \quad (66)$$

A fully implicit formulation is used to solve the above equations. Consider a situation of three-phase coexistence in a Type III phase environment. The unknowns to be solved simultaneously are $p$, $S_1$, $S_2$, $S_3$, $\hat{C}_3$, $\hat{C}_4$, $C_{11}$, $C_{22}$, $C_{13}$, $C_{23}$, $C_{33}$, $C_4$, $C_5$, $C_6$, $C_6^f$, $C_6^s$, $C_6^c$, $C_8^f$, $C_8^s$, $C_8^c$, $C_{T1p}$, $C_{T2p}$. This gives us a total number of 22 unknowns per grid block. The governing equations include:

(A) Seven mass conservation equations—Eq. (1).
(B) Five phase equilibrium equations. For the three phase region in the Type III phase environments there is:

$$C_{11} = 1 \quad (67)$$

$$C_{22} = 1 \quad (68)$$

$$C_{23} = \frac{2a(4-A) + A + \sqrt{(2a(4-A)+A)^2 - 16a^2(4-A)}}{2(4-A)} \quad (69)$$

the binodal curve—Eq. (15) for the microemulsion phase:

$$\frac{C_{33}}{C_{23}} = A\left(\frac{C_{33}}{C_{13}}\right)^{-1} \quad (70)$$

and the composition constraint:

$$\sum_{i=1}^{3} C_{13} = 1 \quad (71)$$

(C) One saturation constraint;

$$\sum_{j=1}^{3} S_j = 1 \quad (72)$$

(D) Six cation exchange equations—Eq. (5). (6), (8), (9), (10), and (11);
(E) Two adsorption equations for surfactant and polymer—Eq. (30);
(F) One tracer partition equations—Eq. (53).

This is a total number of 22 equations per grid block.

A finite difference numerical scheme is used to discretize the governing equations. After the finite differencing, in this embodiment of the present invention there are $22 \times n_b$ nonlinear equations and unknowns for $n_b$ number of grid blocks:

$$\vec{x} = (\vec{x}_1, \vec{x}_2, \ldots, \vec{x}_{n_b}) \quad (73)$$

where $\vec{x}_1$ is a vector of 22 unknowns of the $I^{th}$ gridblock.

To solve the non-linear system of equations, the Newton method is used where the residual vector ($\vec{R}$) needs to be evaluated. The residual vector consists of the finite difference formulation of the 22 equations as a function of $\vec{x}$. $\vec{x}$ is considered as a solution vector at new time level once it satisfies $\vec{R}(\vec{x}) \approx \vec{0}$.

The Newton method is generally described as follows:
(1) Random Selection of a solution vector. Usually, the solution vector at an old time step is used as the initial estimate for the new time step.
(2) Using the randomly-selected solution vector, calculate the residual vector and check for the convergence.
(3) If the residual vector is converged, the randomly-selected solution vector becomes the true solution for the new time step. If it is not converged, another solution vector is updated via:

$$\vec{x}^{new} = \vec{x}^{old} + \Delta \vec{x} \quad (74)$$

and $$\Delta \vec{x} = -\vec{R}(\vec{x}^{old})/J(\vec{x}^{old}) \quad (75)$$

where J is the Jacobian matrix. Steps 2 and 3 are repeated until the solution converged.

Of the 22 equations per grid block, only the 7 mass conservation equations are coupled with the neighboring grid blocks. The 15 uncoupled equations will be referred as constraint equations. The 15 constraint equations are-used to reduce the number of unknowns to be solved. This is referred as unknown reduction or variable reduction. After the variable reduction, there are 7 unknowns that are coupled across the grid blocks. These are referred as the primary unknowns, p, $S_1$, $S_3$, $C_4$, $C_5$, $C_6$, $C_{T1p}$ are chosen as the primary unknowns (variables). The 15 unknowns that are eliminated during the variable reduction are referred as secondary unknowns (variables).

After the variable reduction, the secondary variables are a function of primary variables. Subsequently, all physical properties can be expressed as a function of primary variables only. The physical properties of interest are density, viscosity, interfacial tension, relative permeability, polymer IPV, and polymer permeability reduction. The 7 mass conservation equations per grid block can then be expressed as a function of 7 primary variables of its own grid block and its neighboring grid blocks. This greatly reduces the computational cost of inverting the Jacobian.

While the above Newton method and variable reduction are described for the three phase region of the Phase III environment, they can be easily generalized to other phase environments.

In general for the Type II(−) phase environment and the Type II(−) lobe of the Type III phase environment, this embodiment of the present invention simultaneously solves the following unknowns: p, $S_2$, $S_3$, $\hat{C}_3$, $\hat{C}_4$, $C_{12}$, $C_{22}$, $C_{32}$, $C_{13}$, $C_{23}$, $C_{33}$, $C_4$, $C_5$, $C_6$, $C_6^f$, $C_6^s$, $C_6^c$, $C_8^f$, $C_8^s$, $C_8^c$, $C_{T1p}$, $C_{T2p}$. This provides a total number of 22 unknowns per grid block. The primary variables are p, $S_3$, $C_{13}$, $C_4$, $C_5$, $C_6$, and $C_{T1p}$. The constraint equations of the Type II(−) is the same as that of the Type III phase environment except the phase equilibrium equations. Five phase equilibrium equations are still needed.

First, there is one tie line equation:

$$\frac{C'_{32}}{C'_{22}} = E\left(\frac{C'_{33}}{C'_{13}}\right) \tag{76}$$

Where E is given by Eq. (29) and superscript ' indicates transformed equations:

$$C_{1j}' = C_{1j} \sec\theta \text{ for } j=2,3 \tag{77}$$

$$C_{3j}' = C_{3j} - C_{2j} \tan\theta \text{ for } j=2,3 \tag{78}$$

$$C_{2j}' = 1 - C_{1j}' - C_{3j}' \text{ for } j=2,3 \tag{79}$$

The angle θ is given by Eq. (27). Additionally, we have two binodal curve equations:

$$\frac{C'_{3j}}{C'_{2j}} = A\left(\frac{C'_{3j}}{C'_{2j}}\right)^{-1} \quad j = 2, 3 \tag{80}$$

Finally, we have two compositional constraint equations:

$$\sum_{i=1}^{3} C_{ij} = 1 \text{ for } j = 2, 3 \tag{81}$$

For a true Type II(−) phase environment (that is $C_{SE} < C_{SEL}$), sec θ is 1 and tan θ is 0.

In general for the constraint equations in the Type II(+) phase environment and the Type II(+) lobe of the Type III phase environment, the unknowns which are to be solved in this embodiment of the present invention are: p, $S_1$, $S_3$, $\hat{C}_3$, $\hat{C}_4$, $C_{11}$, $C_{21}$, $C_{31}$, $C_{13}$, $C_{23}$, $C_4$, $C_5$, $C_6$, $C_6^f$, $C_6^s$, $C_6^c$, $C_8^f$, $C_8^s$, $C_8^c$, $C_{T1p}$, $C_{T2p}$. This provides a total number of 22 unknowns per grid block. The primary variables are p, $S_3$, $C_{13}$, $C_4$, $C_5$, $C_6$, and $C_{T1p}$. The constraint equations of the Type II(+) is the same as that of the. Type III phase environment except the phase equilibrium equations. Five phase equilibrium equations are still needed.

First, there is one tie line equation:

$$\frac{C'_{31}}{C'_{21}} = E\left(\frac{C'_{33}}{C'_{13}}\right) \tag{82}$$

where $$E = \left(\frac{1 - (\sec\theta - \tan\theta)C_{2PL} - C_{3PL}}{C_{2PL}\sec\theta}\right) \tag{83}$$

$$\tan\theta = \left(\frac{C_{3M}}{C_{1M}}\right) \tag{84}$$

and $$C_{2PL} = C_{2PL}^* + \left(\frac{C_{SE} - C_{SEU}}{C_{SEL} - C_{SEU}}\right)(1 - C_{2PL}^*) \tag{85}$$

Superscript ' indicates transformed equations:

$$C_{1j}' = C_{1j} \sec\theta \text{ for } j=1,2,3 \tag{87}$$

$$C_{2j}' = 1 - C_{1j}' - C_{3j}' \text{ for } j=1,2,3 \tag{88}$$

The angle θ is given by Eq. (27). Additionally, there is two binodal curve equations:

$$\frac{C'_{3j}}{C'_{2j}} = A\left(\frac{C'_{3j}}{C'_{2j}}\right)^{-1} \quad j = 1, 2, 3 \tag{89}$$

Finally, there is two compositional constraint equations:

$$\sum_{i=1}^{3} C_{ij} = 1 \text{ for } j = 1, 2, 3 \tag{90}$$

For a true Type II(+) phase environment (that is $C_{SE} > C_{SEU}$) sec θ is 1 and tan θ is 0.

As shown in FIG. 2, one aspect of this embodiment of the present invention is checking the phase appearance 8, however before that step occurs the phase Type has to be determined. The phase Type is Type II(−) if $C_{SE} <= C_{SEL}$; Type III if $C_{SE} > C_{SEL}$ and $C_{SE} < C_{SEU}$; and Type II(+) if $C_{SE} >= C_{SEU}$. Once phase Type is determined, the phase appearance can be categorized into the four cases. All cases assume that a water-rich-phase always exists in the grid block.

(1) Single microemulsion phase in Type II(−) phase environment experiences a phase appearance of oil. Based on the binodal curve, oil is set to appear if the following equation is satisfied:

$$\left(C_{13}C_{23} - \frac{C_{33}}{\sqrt{A}}\right) > 0, \tag{91}$$

(2) Single water phase in Type II(+) phase environment experiences a phase appearance of a microemulsion phase. Similarly, a microemulsion phase is set to appear if:

$$(C_{31} - \sqrt{A}C_{21}) > 0, \tag{92}$$

(3) Two phases of oil and microemulsion in the Type II(−) lobe of the Type III phase environment experiences a phase appearance of water. Water is set to appear if the following equation is satisfied:

$$(S_1=C_1-S_3 C_{1M})>0, \quad (93)$$

(4) Two phases of water and microemulsion in the Type II(+) lobe of the Type III phase environment experiences a phase appearance of oil. Oil is set to appear if the following equation is satisfied:

$$(S_2=C_2-S_3 C_{2M})>0, \quad (94)$$

Another embodiment of the present invention further includes a separator flash which uses a separator condition and a well production rate of surfactant, oil, water, cation and anion to determine the phase fraction and phase composition of the production stream. The microemulsion cut, which is the phase fraction of the microemulsion phase is thus determined. This separator flash is conducted well by well. The field phase fraction, phase composition, and microemulsion cut are then obtained by the volume average of the well separator flash results.

The model parameters for salinity, cation exchange, phase behavior required for the separator flash are assumed to be exactly the same as those at the reservoir condition except for the optimum salinity. Because the separator flash is conducted at the separator temperature that is different from the reservoir temperature, one would like to include the temperature effect on the optimum salinity. The optimum salinity is assumed to be a function of temperature as shown below:

$$\ln(CSE_{op}^{T1})-\ln(CSE_{op}^{T2})=AT^*(T1-T2) \quad (95)$$

where AT is a model parameter and the superscripts T1 and T2 denote the optimum salinity evaluated at temperature T1 and T2, respectively and $$CSE_{op} = \frac{CSEL + CSEU}{2} \quad (96)$$

Additionally, the range of salinity for Type III is given by:

$$\frac{CSEU^{T1} - CSEL^{T1}}{CSE_{op}^{T1}} = \frac{CSEU^{T2} - CSEL^{T2}}{CSE_{op}^{T2}} \quad (97)$$

Equations (95) to (97) are used to calculate the new optimum salinity at the separator temperature. Subsequently, Equations (5) to (29) are used to solve the phase split and the phase composition.

While in the foregoing specification this invention has been described in relation to certain preferred embodiments thereof, and many details have been set forth for purpose of illustration, it will be apparent to those skilled in the art that the invention is susceptible to alteration and that certain other details described herein can vary considerably without departing from the basic principles of the invention.

What is claimed is:

1. A method of modeling a surfactant flood in a petroleum reservoir, comprising:
   (a) solving a mass conservation equation for each component of a reservoir model with constraint equations for simulating the petroleum reservoir undergoing the surfactant flood to obtain a plurality of solutions;
   (b) utilizing the plurality of solutions to determine physical properties associated with the petroleum reservoir wherein;
      (i) phase relative permeabilities are evaluated using a continuous relative permeability model to cover a full spectrum of phase behavior: and
      (ii) physical consistency of the continuous relative permeability model is maintained over phase transitions between Type II(−) to Type III systems and Type II(+) to Type III systems: and
   (c) displaying the physical properties associated with the petroleum reservoir.

2. The method of claim 1 wherein the mass conservation equation for each component of the reservoir model with constraint equations is solved implicitly.

3. The method of claim 1 further comprising:
   (d) determining a phase fraction and phase composition of a production stream that accounts for a temperature effect on an optimum salinity, the phase fraction and phase composition being determined using a separator flash that utilizes a separator condition and well production rates of surfactant, oil, water, cation and anion.

4. The method of claim 1 wherein rock properties are used to evaluate surfactant properties for the surfactant flood.

5. The method of claim 1 wherein solving the mass conservation equation for each component of the reservoir model with constraint equations provides pressure, saturation, and composition for the petroleum reservoir.

6. The method of claim 1 wherein the phase relative permeabilities evaluated using the continuous relative permeability model to cover the full spectrum of phase behavior include relative permeabilities associated with a microemulsion phase, a water phase, and an oil phase.

7. The method of claim 1 wherein the continuous relative permeability model limits a relative permeability a low capillary number to approach a relative permeability of a water phase at a low capillary number for the phase transitions between Type II(+) and Type III systems.

8. The method of claim 1 wherein the continuous relative permeability model limits a relative permeability of a microemulsion phase at a low capillary number to approach a relative permeability of an oil phase at a low capillary number for the phase transitions between Type II(+) and Type III systems.

9. The method of claim 1 wherein:
   the continuous relative permeability model limits a relative permeability of a microemulsion phase at a low capillary number to approach a relative permeability of a water phase at a low capillary number for the transitions between Type II(−) and Type III systems; and
   the continuous relative permeability model limits the relative permeability of the microemulsion phase at the low capillary number to approach a relative permeability of an oil phase at a low capillary number for the transitions between Type II(+) and Type Ill systems.

10. A method of simulating a surfactant flood in a petroleum reservoir, the method comprising:
   (a) providing a model Of a petroleum reservoir undergoing the surfactant flood, the model having a grid defining a plurality of grid blocks such that each grid block is associated with fluid therewithin;
   (b) determining a phase behavior within each grid block;
   (c) formulating, a plurality of constraint equations for each grid block, at least one of the plurality of constraint equations being determined responsive to the phase behavior within each grid block;

(d) simulating the model of the petroleum reservoir by solving the constraint equations using a fully implicit scheme the solutions to the constraint equations including phase relative permeabilities that are evaluated using a continuous relative permeability model to cover a full spectrum of phase behavior, wherein physical consistency of the continuous relative permeability model is maintained over phase transitions between Type II(−) to Type III systems and Type II(+) Type III systems: and (e) producing a display responsive to simulating the model of the petroleum reservoir in step (d).

11. The method of claim 10 wherein the phase relative permeabilities evaluated using the continuous relative permeability model to cover the full spectrum of phase behavior include relative permeabilities associated with a microemulsion phase, a water phase, and an oil phase.

12. The method of claim 10 wherein the continuous relative permeability model limits a relative permeability of a microemulsion phase at a low capillary number to approach a relative permeability of a water phase at a low capillary number for the phase transitions between Type II(−) and Type III systems.

13. The method of claim 10 wherein the continuous relative permeability model limits a relative permeability of a microemulsion phase at a low capillary number to approach a relative permeability of an oil phase at a low capillary number for the phase transitions between Type (+) and Type III systems.

14. A method of simulating a surfactant flood in a petroleum reservoir, the method comprising:

(a) providing a model of a petroleum. reservoir, the model having a grid defining a plurality of grid blocks such that each grid block is associated with fluid therewithin:

(b) determining a phase behavior of the fluid within each grid block;

(c) determining phase relative permeabilities utilizing a continuous relative permeability model while maintaining physical consistency of the relative permeability model as the phase behavior of the fluid varies between Type II(−) Type III, and Type II(+) systems, the determining phase relative permeabilities comprises:

(i) limiting the relative permeability model at a microemulsion phase at a low capillary number to approach a relative permeability of a water phase at a low capillary number when the phase behavior of the fluid varies between Type II(−) and Type III systems; and (ii) limiting the relative permeability model at the microemulsion phase at the low capillary number to approach a relative permeability of an oil phase at a low capillary number when the phase behavior of the fluid varies between Type II(+) and Type III systems;

(d) simulating the model of the petroleum reservoir using the phase relative permeabilities determined in step (c); and (e) producing a display responsive to the simulating the model of the petroleum reservoir in step (d).

15. The method of claim 14 wherein the simulating the model of the petroleum reservoir in step (d) includes solving a plurality of constraint equations for each grid block using a fully implicit scheme at least one of the plurality of constraint equations being associated with the phase relative permeabilities determined in step (c).

* * * * *

UNITED STATES PATENT AND TRADEMARK OFFICE
CERTIFICATE OF CORRECTION

| | |
|---|---|
| PATENT NO. | : 7,983,886 B2 |
| APPLICATION NO. | : 11/852679 |
| DATED | : July 19, 2011 |
| INVENTOR(S) | : Irene Lee Gullapalli et al. |

It is certified that error appears in the above-identified patent and that said Letters Patent is hereby corrected as shown below:

On the Title Page Item (75), the inventor's name is incorrectly listed as "Mark Chih-Hung" and should be corrected as follows -- Mark Chih-Hung Chien --.

Signed and Sealed this
Second Day of October, 2012

David J. Kappos
*Director of the United States Patent and Trademark Office*